United States Patent
Kaushik (10) Patent No.: US 10,070,263 B1
(45) Date of Patent: Sep. 4, 2018

(54) USING LOCATION TO DETECT LOCATION OF NETWORK POISONING ATTACKS IN WI-FI BASED LOCATIONING

(71) Applicant: Fortinet, Inc., Sunnyvale, CA (US)

(72) Inventor: Anil Kaushik, Bangalore (IN)

(73) Assignee: Fortinet, INc, Sunnyvale, CA (US)

( * ) Notice: Subject to any disclaimer, the term of this patent is extended or adjusted under 35 U.S.C. 154(b) by 0 days.

(21) Appl. No.: 15/859,663

(22) Filed: Dec. 31, 2017

(51) Int. Cl.
*H04W 4/00* (2018.01)
*H04W 4/029* (2018.01)
*H04W 12/12* (2009.01)
*H04W 12/08* (2009.01)
*H04W 12/10* (2009.01)
*H04W 12/06* (2009.01)

(52) U.S. Cl.
CPC ........... *H04W 4/029* (2018.02); *H04W 12/06* (2013.01); *H04W 12/08* (2013.01); *H04W 12/10* (2013.01); *H04W 12/12* (2013.01)

(58) Field of Classification Search
CPC ..... H04W 4/029; H04W 12/06; H04W 12/08; H04W 12/10; H04W 12/12
See application file for complete search history.

(56) References Cited

U.S. PATENT DOCUMENTS

| 2006/0240840 A1* | 10/2006 | Morgan | G01S 5/02 455/456.1 |
| 2007/0213071 A1* | 9/2007 | Hwang | H04W 8/08 455/456.1 |
| 2013/0190027 A1* | 7/2013 | Cao | H04W 52/0206 455/509 |
| 2015/0264536 A1* | 9/2015 | Patil | H04W 4/029 455/456.1 |
| 2016/0323311 A1* | 11/2016 | Kumar | H04W 12/12 |

* cited by examiner

*Primary Examiner* — Keith Fang
(74) *Attorney, Agent, or Firm* — Law Office of Dorian Cartwright; Dorian Cartwright (57) ABSTRACT

Poisoning attacks are detected and resulting location data is excluded from location-based services. Rogue devices can use a MAC address in a source field of network data packet in order to appear as a trusted station to the access point in order to inject poisonous location data. Responsive to detecting that a change in location is suspicious, the change in location is excluded from the location-based service. Otherwise, the location change can be relied upon for providing the location-based service, as a default operation. Subsequent location-based service is provided by a locationing server using location information from connected stations while excluding suspicious changes in location.

5 Claims, 5 Drawing Sheets

USING LOCATION TO DETECT LOCATION OF NETWORK POISONING ATTACKS IN WI-FI BASED LOCATIONING

FIELD OF THE INVENTION

The invention relates generally to computer hardware for wireless networking, and more specifically, to detecting locationing network poisoning attacks in Wi-Fi based locationing.

BACKGROUND

Many mobile computing devices, such as smartphones, determine current location. Cloud-based systems can provide location-based service based on analytics collected from locations and location updates of stations. Some services are reliant upon accurate locations, a need met by known Wi-Fi locationing services.

However, hackers will try to disrupt pristine data collections by injecting poisonous data. This harmful, false information can cause undesirable results, such as fraudulently generated financial offers.

What is needed is a robust technique for detecting locationing network poisoning attacks in Wi-Fi based locationing. A technological problem exists in that, without the identification and exclusion of poisonous location data, systems that are dependent upon reliable location data and analytics will have degraded performance.

SUMMARY

These shortcomings are addressed by the present disclosure of locationing methods, non-transitory computer readable mediums, and systems for detecting locationing network poisoning attacks in Wi-Fi based locationing.

In one embodiment, ranges for a plurality of access points in communication n with the locationing. Rogue devices can use a MAC address in a source field of network data packet in order to appear as a trusted station to the access point in order to inject poisonous location data.

In one embodiment, a location-based service is provided by a locationing server using location information from connected stations while excluding suspicious changes in location. Subsequent to storing the range of access points, transmission signals are received from access points with connected stations. More specifically, a hardware network communications interface of the locationing server device is coupled to the data communication network. The transmission signals corresponding to a plurality of messages with location information derived from Wi-Fi communications between a specific access point and a specific station associated with the specific access point for data communications of the data communication network.

In some embodiments, responsive to detecting that a change in location is suspicious, the change in location is excluded from the location-based service. The suspicious status can be based on at least one of the locations corresponding to a range of a second specific access point of the plurality of access points and not to a range of the specific access point. Otherwise, the location change can be relied upon for providing the location-based service, as a default operation.

In still other embodiments, a location-based service is provided by a locationing server using location information from connected stations while excluding suspicious changes in location.

Advantageously, reliability of location based services is enhanced. One technological problem solved is that the range comparison technique for identifying suspicious locations improves the performance of location based services offered by computer hardware devices by eliminating poisonous data.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Location-based service systems, computer-implemented methods, and (non-transitory) computer-readable mediums that provide the location-based service while excludes bad location data from locationing poisoning attacks I Wi-Fi based locationing, are described.

Location can serve many purposes. For example, digital location-based coupons can be displayed to customers walking around a grocery store based on location without being spoofed by hackers as to the actual number of customers at a particular location. Other examples involve data analytics. One of ordinary skill in the art will recognize, given the following disclosure, additional embodiments within the spirit of the present invention that are not specifically referred to herein merely in the interest of conciseness.

I. Systems to Detect Wi-Fi Based Locationing Network Poisoning Attacks (FIGS. 1-2)

Figure 1:
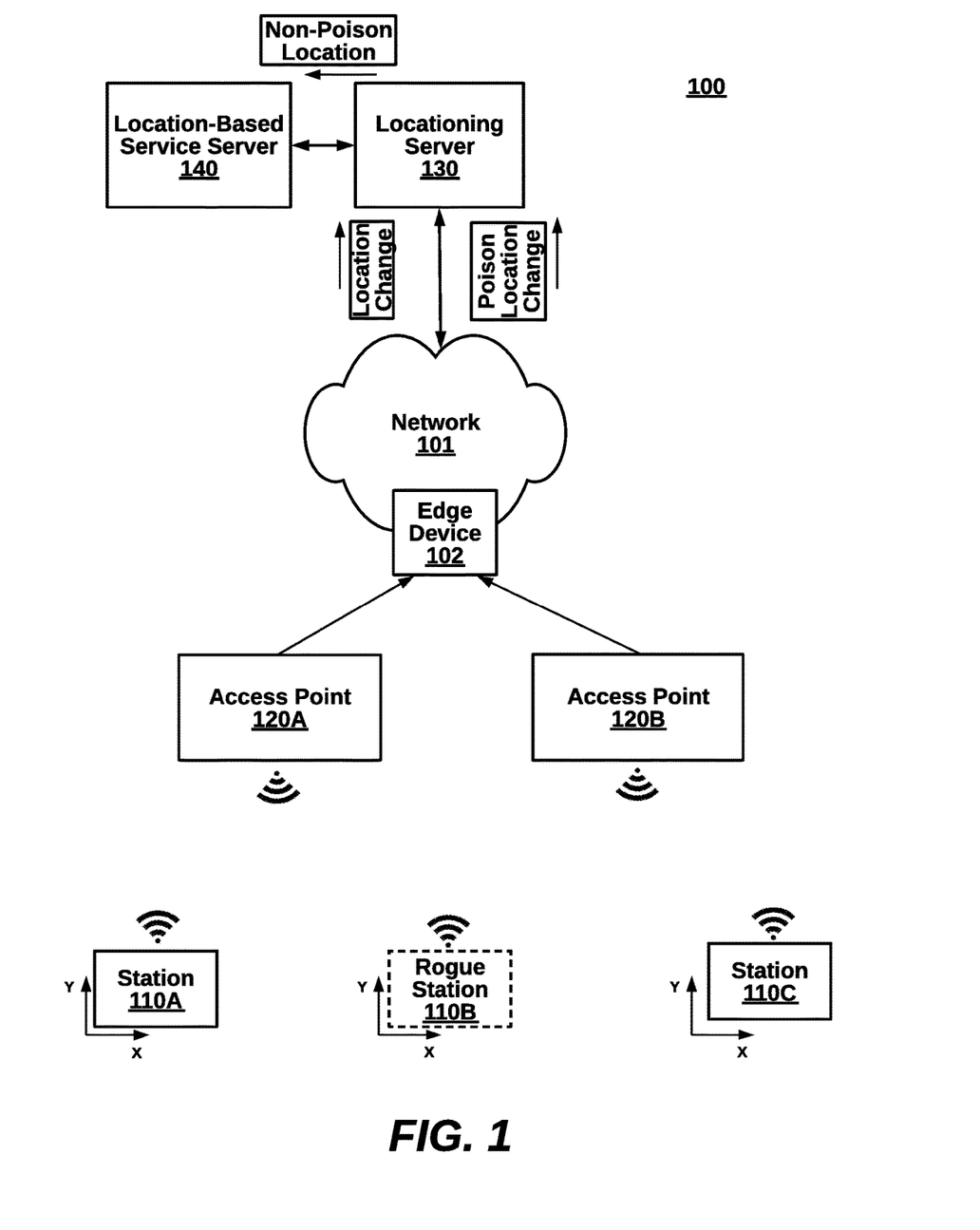
FIG. 1 is a block diagram illustrating a high-level view of a location-based service system that excludes bad location data from locationing network poisoning attacks in Wi-Fi based locationing, according to an embodiment.
Figure 2:
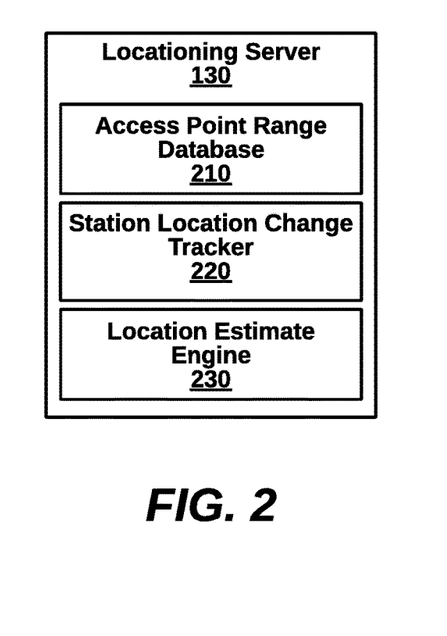
FIG. 2 is a block diagram illustrating a more detailed view of a locationing server of the system of claim 1, according to an embodiment.

FIG. 1 is a block diagram illustrating a high-level view of a location-based service system 100 that excludes bad location data from locationing network poisoning attacks in Wi-Fi based locationing, according to an embodiment. The system 100 primarily comprises stations 110A-C, access points 120A,B, locationing server 130, and location-based server 140. The network components can be implemented as hardware, software, or a combination of both. Many other embodiments are possible, for example, with more mobile devices or different types of mobile devices.

The wireless stations A-C are wirelessly coupled to the access points 120A,B over a Wi-Fi data communication channel, which are in turn coupled (e.g., via hardwired Ethernet cords) to the locationing server 130 over network 101. The backend connection can be through an edge device 102 such as an access point, a router, a cell tower, or a satellite. The network can be, for example, the Internet, a WAN, a LAN, a 3G or 4G cellular data network, a hybrid network, or any other type of data communication network. Wireless components preferably use communication protocols such as IEEE (Institute of Electronic and Electrical Engineers) 802.11 n and IEEE 802.11 ac wave 2, in addition to other protocols such as other IEEE 802.11s, IEEE 802.3, Bluetooth, 3G and 4G. The enterprise network can serve, for example, a business enterprise, a hospital or system of hospital, school, building, a private network, or the like. The enterprise network can be, for example, the Internet, a cellular network, a larger enterprise network to which the enterprise network is a smaller component of, or a combination of network types.

The stations 110A-C periodically transmit locations either directly or indirectly through interactions with the access points 120A,B. When network packets are transmitted at a fixed power, the RSSI at an access point receiving the network packets can be indicative of flight distance at an estimated attenuation rate. In one embodiment, lower powered Bluetooth LE transmitters send out locations with a unique tag id.

A transmission is received with an RSSI measurement. The RSSI measurement suggests how far away from the source location of the data packet. Generally, the weaker the RSSI, the farther away from a packet transmission point. The RSSI measurement in one stance has a maximum value of 100 and has 101 different potential measurement levels, as determined by chipsets by Cisco Systems or Atheros, for example. The location is estimated by the locationing server 130 using additional heuristics such as previous speed and direction of movement, in some embodiments.

The rogue station 110B attempts to inject poison data into the analytics, for instance, to create a desired response form location-based services (e.g., cause a coupon to be offered based on a location). In one case, the rogue station intercepts wireless transmissions from other stations to identify a MAC address in contact with a particular SSID (or tag id of a Bluetooth LE transmitter). The rogue station 110B can then vary its transmission power to emulate an RSSI of a false location. The station is at times the assumed location of a user registered with the mobile device. The techniques discussed below identify the rogue station 110B by identifying locations emulated by the rogue station 110B that are not within radio range of the access point receiving the transmission.

In one embodiment, the stations 110A-C individually comprise one of a smartphone, a table computer, a Chromebook, an iPad, a laptop computer, a desktop computer, a networked appliance, an automobile, or any other type of mobile apparatus. The station comprises transmitter with a W-Fi radio capable of wirelessly sending network packets over a radio frequency corresponding to any of the access points.

The access points 120A,B send location data derived form network packets received from the stations 110A-C, in one implementation. The location data is pre-processed in some implementations.

The locationing server 130 outputs locations and/ or location changes responsive to location data uploaded by access points from interactions with stations. Responsive to identifying locations or changes in locations involving a location outside a range of a specific access point reporting location data, the locations can be marked as suspicious. Based on the level of suspicious, or in a binary approach, suspicious locations are excluded for data analytics and other consequential location-based services In some embodiments, the locationing server 130 provides software as a service in the form or location updates to a large number of unassociated devices. The service can be provided directly to a location module of the operating system on the mobile device providing locations to apps running on the operating system. The service can also be provided to a higher-level app, such as Google Maps.

In some other embodiments, the locationing server 130 along with the location devices are all owned by a single entity and operated over an enterprise LAN. The locationing server 130 can be, for example, a FortiPresence device by Fortinet of Sunnyvale, Calif. The locationing server 130 can also be a Wi-Fi controller that manages the access points 120A,B with respect to SSIDs and which stations to associate. As a result, the Wi-Fi controller can provide seamless network access to a mobile station that traverses across the range of different access points, with fast transition techniques making the change transparent to a user and mostly transparent to the mobile station. Additionally, the Wi-Fi controller can assign a unique SSID to a single mobile station, changing associations among access points as th mobile station traverses corresponding ranges of the access points.

A more detailed embodiment of the locationing server 130 is set forth in FIG. 2. The locationing server 130 includes an access point range database 210 to register access points and latest reporting of range. The radio range can be varied based on certain transmission conditions, such as transmission power. A station location change tracker 322 stores previous locations and time stamps for each station. A location estimate engine 230 can use various algorithms to estimate a current location based on one or more of one or more tag ids, RSSI measurements, mobile device speed, mobile device trajectory, and any other implementation-specific factors. Access points can also share parts of the load in location estimates.

I. Methods for Detecting Wi-Fi Based Locationing Network Poisoning Attacks (FIGS. 3-4)

Figure 3:
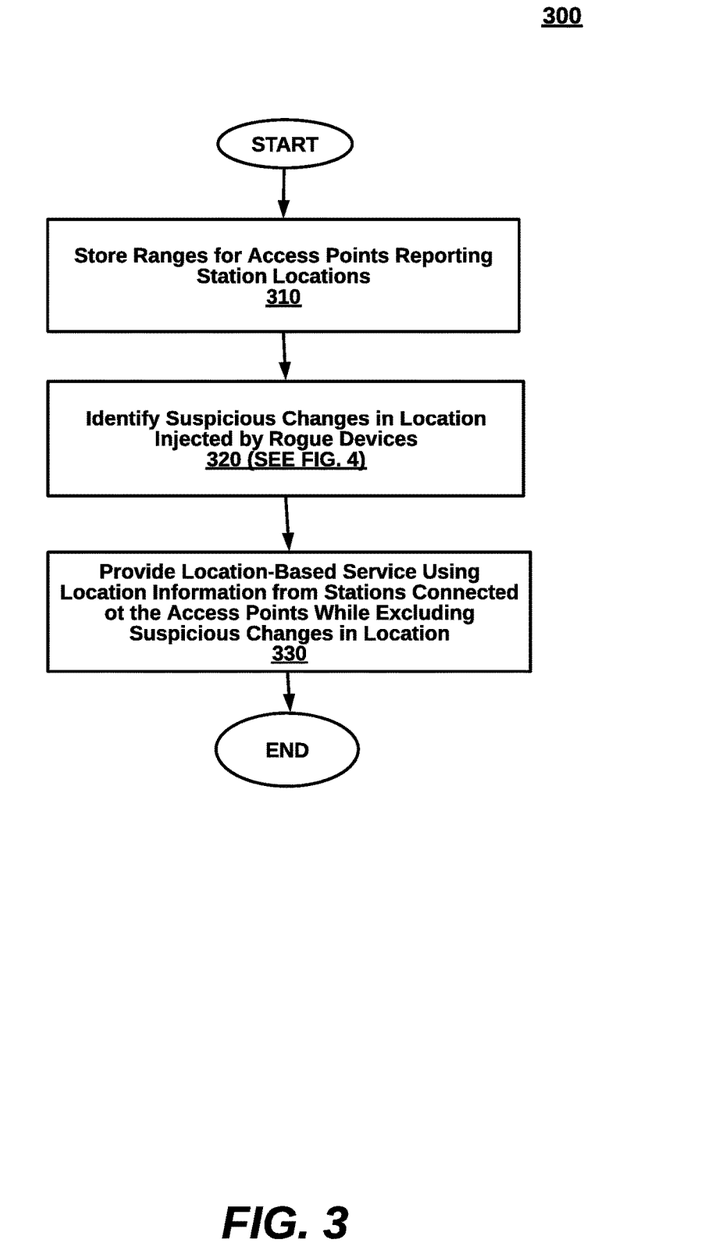
FIG. 3 is a flow chart illustrating a high-level view of a method for providing a location-based service that excludes bad location data from locationing network poisoning attacks in Wi-Fi based locationing, according to an embodiment.
Figure 4:
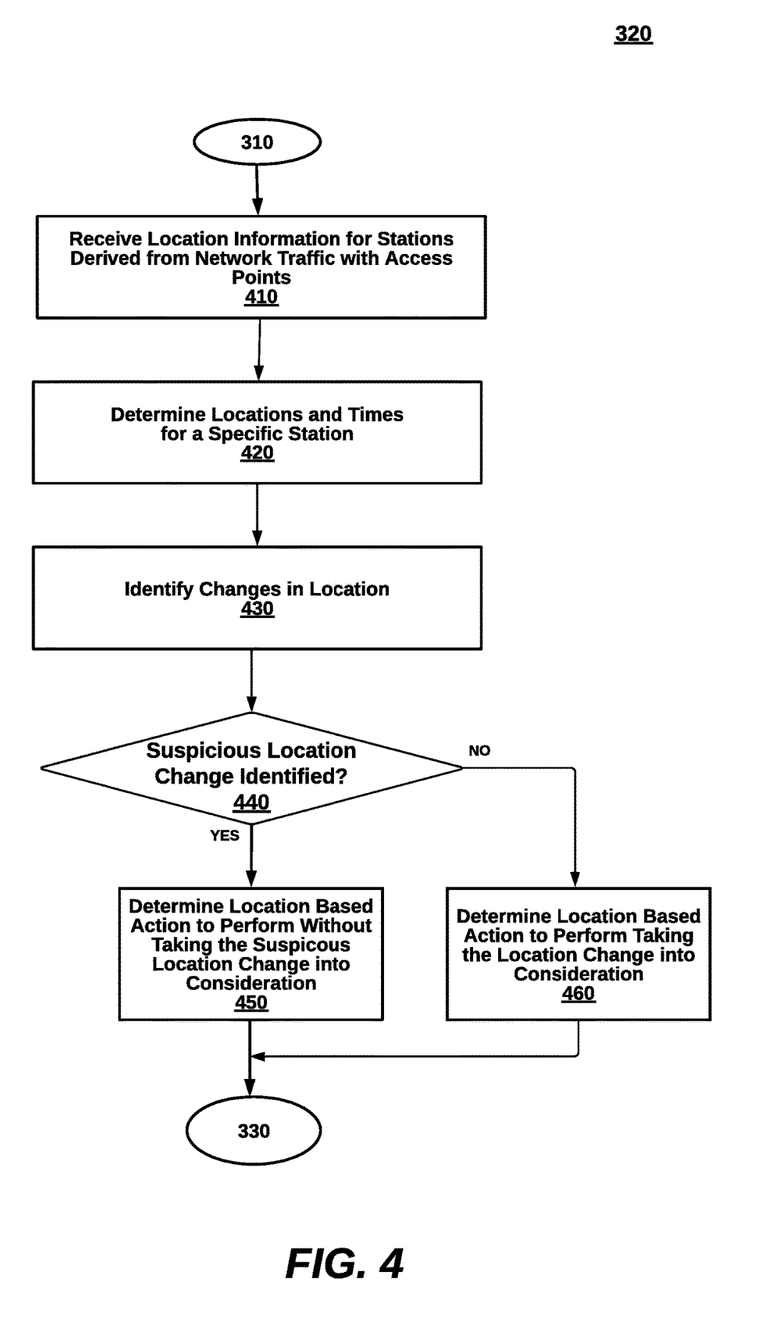
FIG. 4 is a flow chart illustrating a more detailed view of a step of identifying suspicious location changes, from the method of FIG. 4, according to an embodiment.

FIG. 3 is a flow chart illustrating a high-level view of a method 300 for providing a location-based service that excludes bad location data from locationing network poisoning attacks in Wi-Fi based locationing, according to an embodiment. The method 300 can be implemented, for example, in the system 100 of FIG. 1, or other systems. Additionally, the steps can be performed in different orders.

At step 310, ranges for a plurality of access points in communication with the locationing server device are stored in a database, spreadsheet, or list. The access points can authenticate to the locationing server in order to maintain a secure communication channel for reporting station locations protected from rogue devices. The rogue devices can use a MAC address in a source field of network data packet in order to appear as a trusted station to the access point in order to inject poisonous location data. A range can be updated from time to time and can be defaulted as a circular shape around a station location where a wireless station can maintain communications with the access point. The range can be defined by transmission power of the access point and varied by increasing or decreasing transmission power. The circular default may also be affected by structures, interference, and other signal blockers and signal attenuators. As a result, at a particular time, each location may have one, more than one, or no access points within range.

At step 320, a location-based service is provided by a locationing server using location information from connected stations while excluding suspicious changes in location. More specifically, FIG. 4 shows one embodiment of subsets to the step 320.

Turning to FIG. 4, at step 410, subsequent to storing the range of access points, transmission signals are received from access points with connected stations. More specifically, a hardware network communications interface of the locationing server device is coupled to the data communication network. The transmission signals corresponding to a plurality of messages with location information derived from Wi-Fi communications between a specific access point and a specific station associated with the specific access point for data communications of the data communication network.

At step 420, a plurality of locations and times for the specific station from the plurality of messages are determined. Various algorithms can be used to determine location. RSSI measurements, flight time, Bluetooth LE locationing beacons, and the like can be used to determine a specific location at a certain time.

At step 430, changes in location for a location-based service provided by the locationing server device are identified. For example, RSSI measurements can be indicative of a location and a change in RSSI can be indicative of a change in location.

Responsive to detecting that a change in location is suspicious, at step 440, the change in location is excluded from the location-based service in step 450. The suspicious status is based on at least one of the locations corresponding to a range of a second specific access point of the plurality of access points and not to a range of the specific access point. Otherwise, at step 440, the location change is relied upon for providing the location-based service at step 445, as a default operation.

Returning to FIG. 3, at step 330, a location-based service is provided by a locationing server using location information from connected stations while excluding suspicious changes in location. Optional in some embodiments, a network security action is performed on the specific station responsive to the suspicious location change, in the present embodiment. Other actions are possible, in other embodiments.

III. Generic Computing Device (FIG. 5)

Figure 5:
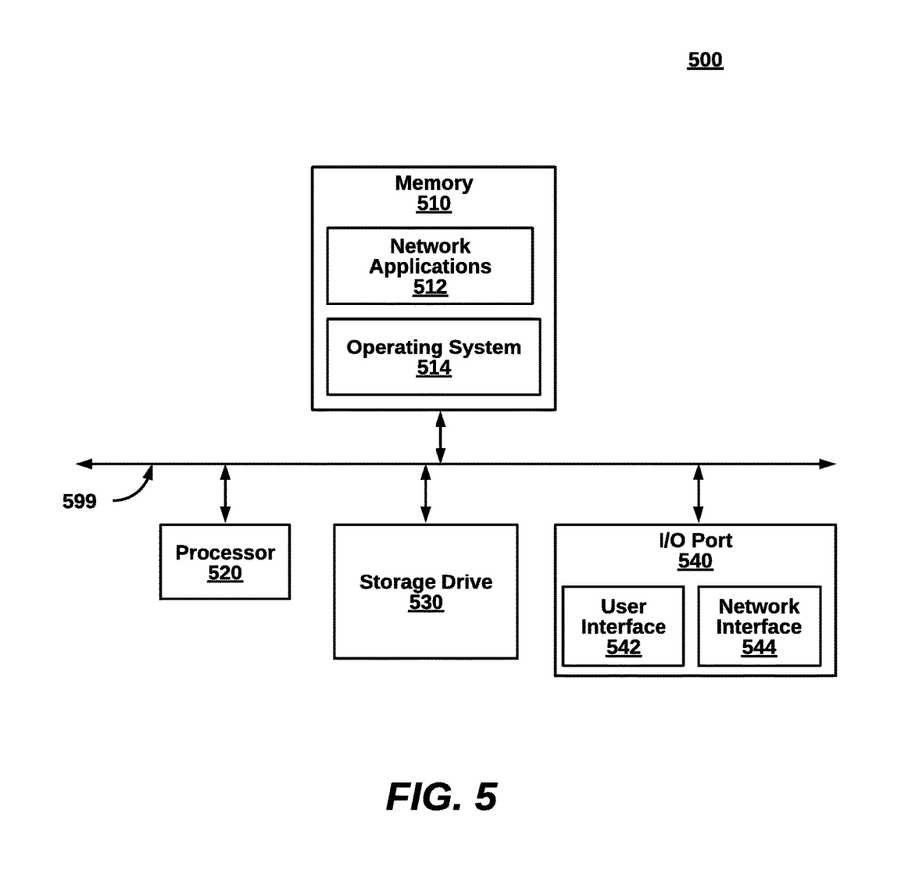
FIG. 5 is a block diagram illustrating an exemplary computing device, according to one embodiment.

FIG. 5 is a block diagram illustrating an exemplary computing device 500 for use in the system 100 of FIG. 1, according to one embodiment. The computing device 500 is an exemplary device that is implementable for each of the components of the system 100, including the wireless stations 110A-C, the access points 120A,B and the locationing server 130. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 500, of the present embodiment, includes a memory 510, a processor 520, a storage drive 530, and an I/O port 540. Each of the components is coupled for electronic communication via a bus 599. Communication can be digital and/or analog, and use any suitable protocol.

The memory 510 further comprises network applications 512 and an operating system 516. The network applications 512 can include the module. Other network applications 512 can include a web browser, a mobile application, an application that uses networking, a remote application executing locally, a network protocol application, a network management application, a network routing application, or the like.

The operating system 516 can be one of the Microsoft Windows® family of operating systems (e.g., Windows 95, 98, Me, Windows NT, Windows 2000, Windows XP, Windows XP x86 Edition, Windows Vista, Windows CE, Windows Mobile, Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 520 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530.

The storage drive 530 can be any non-volatile type of storage such as a magnetic disc, EEPROM, Flash, or the like. The storage drive 530 stores code and data for applications.

The I/O port 540 further comprises a user interface 542 and a network interface 544. The user interface 642 can output to a display device and receive input from, for example, a keyboard. The network interface 544 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A locationing server device communicatively coupled to a data communication network to improve location-based services by excluding poisonous location data from locationing network poisoning attacks by rogue devices in Wi-Fi based locationing, the method comprising the steps of:
    storing ranges for a plurality of access points in authenticated communication with the locationing server device over the data communication network;
    subsequent to storing the ranges for the plurality of access points, receiving transmission signals from access points that have connected stations relied upon for location-based services, via a hardware network communications interface of the locationing server device that is coupled to the data communication network, the transmission signals corresponding to a plurality of messages with location information derived from Wi-Fi communications between a specific access point and a specific station associated with the specific access point for data communications of the data communication network;
    determining a plurality of locations and times for the specific station from the plurality of messages;
    identifying changes in location for a location-based service provided by the locationing server device;
    detecting that a change in location is suspicious and excluding the change in location from being relied upon by the location-based service, wherein detecting comprises determining that at least one of the locations corresponds to a range of a second specific access point of the plurality of access points and not to a range of the specific access point; and
    providing the network-based service to an external device without the excluded change in location responsive to the suspicious location change.

2. The method of claim 1, wherein a rogue device varies transmission power for different network packets to the specific access point.

3. The method of claim 1, wherein the location-based service comprises a navigation app.

4. A non-transitory computer readable medium in mobile device communicatively coupled to a data communication network, storing code to conserve battery power, when executed by a processor in locationing server device communicatively coupled to a data communication network to improve location-based services by excluding poisonous location data from locationing network poisoning attacks by rogue devices in Wi-Fi based locationing, the method comprising the steps of:
    storing ranges for a plurality of access points in authenticated communication with the locationing server device over the data communication network;
    subsequent to storing the ranges for the plurality of access points, receiving transmission signals from access points that have connected stations relied upon for location-based services, via a hardware network communications interface of the locationing server device that is coupled to the data communication network, the transmission signals corresponding to a plurality of messages with location information derived from Wi-Fi communications between a specific access point and a specific station associated with the specific access point for data communications of the data communication network;
    determining a plurality of locations and times for the specific station from the plurality of messages;
    identifying changes in location for a location-based service provided by the locationing server device;
    detecting that a change in location is suspicious and excluding the change in location from being relied upon by the location-based service, wherein detecting comprises determining that at least one of the locations corresponds to a range of a second specific access point of the plurality of access points and not to a range of the specific access point; and
    providing the network-based service to an external device without the excluded change in location responsive to the suspicious location change.

5. A locationing server device communicatively coupled to a data communication network to improve location-based services by excluding poisonous location data from locationing network poisoning attacks by rogue devices in Wi-Fi based locationing, the locationing server device comprising:
    a memory to store ranges for a plurality of access points in authenticated communication with the locationing server device over the data communication network;
    a hardware network communication interface coupled to the data communication network to receive transmission signals, subsequent to storing the ranges for the plurality of access points, the transmission signals being from access points that have connected stations relied upon for location-based services, the transmission signals corresponding to a plurality of messages with location information derived from Wi-Fi communications between a specific access point and a specific station associated with the specific access point for data communications of the data communication network; and
    a processor to determine a plurality of locations and times for the specific station from the plurality of messages, the processor to identify changes in location for a location-based service provided by the locationing server device, and
    the processor to detect that a change in location is suspicious and excluding the change in location from being relied upon by the location-based service, wherein detecting comprises determining that at least one of the locations corresponds to a range of a second specific access point of the plurality of access points and not to a range of the specific access point, wherein the locationing server provides the network-based service to an external device without the excluded change in location responsive to the suspicious location change.

* * * * *